(12) United States Patent
Rahijärvi

(10) Patent No.: US 6,250,872 B1
(45) Date of Patent: Jun. 26, 2001

(54) TRAILER

(75) Inventor: Antti Rahijärvi, Järvenpää (FI)

(73) Assignee: Mika Marko Rahijärvi, Järvenpää (FI)

( * ) Notice: Subject to any disclaimer, the term of this patent is extended or adjusted under 35 U.S.C. 154(b) by 0 days.

(21) Appl. No.: 09/424,418

(22) PCT Filed: Jun. 9, 1998

(86) PCT No.: PCT/FI98/00493

§ 371 Date: Nov. 23, 1999

§ 102(e) Date: Nov. 23, 1999

(87) PCT Pub. No.: WO98/58817

PCT Pub. Date: Dec. 30, 1998

(30) Foreign Application Priority Data

Jun. 19, 1997 (FI) .......................................................... 972644

(51) Int. Cl.$^7$ .................................................. B60P 1/64
(52) U.S. Cl. ........................ 414/500; 280/414.1; 414/494
(58) Field of Search ................................... 414/494, 500; 280/414.1

(56) References Cited

U.S. PATENT DOCUMENTS

| | | | | |
|---|---|---|---|---|
| 1,562,364 | * | 11/1925 | Reasoner | 414/500 |
| 1,567,478 | * | 12/1925 | Vonnez et al. | 414/500 |
| 2,534,156 | * | 12/1950 | Wyatt et al. | 414/500 |
| 2,817,537 | * | 12/1957 | Atkinson | 280/414.1 |
| 2,969,885 | | 1/1961 | Lutz | 214/500 |
| 3,111,236 | * | 11/1963 | Irey | 414/494 |
| 3,447,815 | * | 6/1969 | West | 280/414.1 |
| 3,703,244 | * | 11/1972 | Walsh et al. | 414/500 |
| 3,934,740 | * | 1/1976 | Rumell | 414/500 X |
| 5,556,249 | | 9/1996 | Heine | 414/500 |

FOREIGN PATENT DOCUMENTS

| | | |
|---|---|---|
| 2558425 | 7/1977 | (DE) . |
| 0002056 | 5/1979 | (EP) . |
| 0011250 | 5/1980 | (EP) . |
| 0061959 | 10/1982 | (EP) . |
| 74660 | 10/1979 | (FI) . |
| 453740 | 7/1986 | (SE) . |
| WO8607019 | 12/1986 | (WO) . |
| WO8804618 | 6/1988 | (WO) . |

* cited by examiner

*Primary Examiner*—Steven A. Bratlie
(74) *Attorney, Agent, or Firm*—Van Dyke, Gardner, Linn & Burkhart, LLP

(57) ABSTRACT

A light-duty trailer hitchable to a passenger car, van or the like, includes a separate chassis element equipped with wheels, and an interchangeable platform mountable thereon. The chassis element is provided with means for hauling the platform on top of the chassis element. The chassis element has its rear section provided with a guide roller close to an axial line extending between the wheels, and the underside of the platform is provided with a guide bar extending lengthwise of the platform and intended for cooperation with the guide roller as the platform is being hauled on top of the chassis element.

16 Claims, 5 Drawing Sheets

TRAILER

The present invention relates to a trailer hitchable to a passenger car, a van or the like, comprising a separate chassis element equipped with wheels, and an interchangeable platform mountable thereon, said chassis element being provided with means for hauling the platform on top of the chassis element.

The recommended beam weight for a trailer towed by a car or a van is about 30–40 kg, i.e. the fluctuation range is quite narrow. In commercially available light-duty trailers, the balance problem can only be solved by loading the trailer properly. If the beam weight is too heavy or light, the load must be shifted and secured to another position. It is required that the platform of an interchangeable-platform trailer can also be loaded when lowered down from the top of the chassis. Thus, the center of gravity of a platform is set in various positions, depending on the amount, weight, and position of a load. One object of the present invention is to provide such a car- or van-pulled trailer that is suitable for a multitude of applications by readily replacing the platform and wherein the beam weight can be set at an optimal level without rearranging the loading, even though the center of gravity of a loaded platform cannot be known in advance. Another object is to provide an interchangeable-platform trailer, wherein the beam weight can be maintained during the course of lifting and lowering the platform at such a level that the chassis can be worked with even when disconnected from the tractor vehicle without the load urging to wrench the beam vigorously upright.

In addition, it is necessary that the interchangeable platform can be secured to the chassis in various locations, which is why the locking must be simple and absolutely reliable in operation, nor can it be releasable in any conditions by itself. Hence, still another object of the present invention is to provide a sufficiently user-friendly locking system, which is readily and conveniently securable. Yet another further object of the invention is to provide an interchangeable-platform trailer, wherein the platform can be brought on top of the chassis, even if the chassis and the platform were not absolutely in line or register with each other. A further object of the invention is to provide a solution, which is operable also in soft terrain and in the case of a platform frozen to the ground.

BRIEF DESCRIPTION OF THE DRAWINGS

The invention will now be described with reference made to the accompanying drawings, in which.

DETAILED DESCRIPTION OF THE PREFERRED EMBODIMENTS

Figure 5:
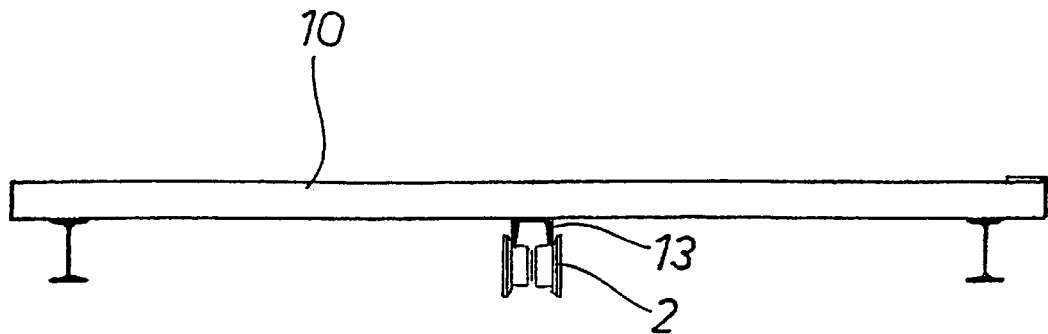
FIG. 5 shows one detail in a trailer solution of the invention.
Figure 6:
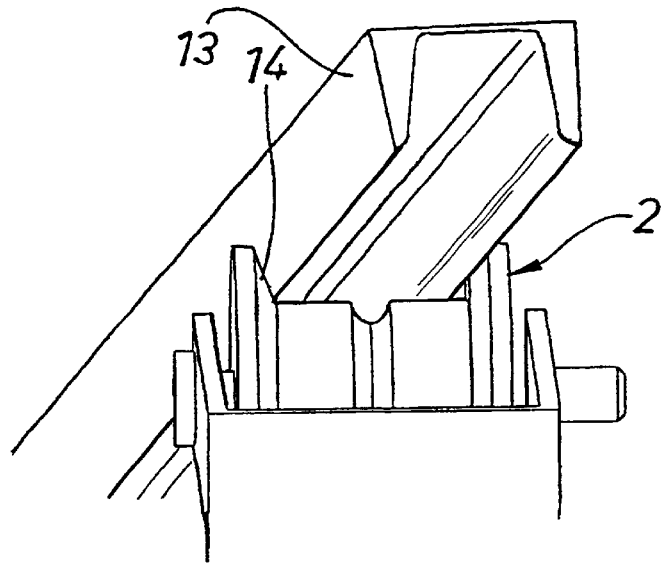
FIG. 6 shows the same detail in an enlarged view.

According to the invention, the interchangeable-platform trailer of the invention comprises a chassis element 1 fitted with wheels 3, and an interchangeable platform 10 mountable on top of the same. The chassis element 1 is provided with a hauling means 5, e.g. a winch, including a hauling cable, e.g. a rope, chain, a line or the like (hauling cable is not shown in the figures) for pulling the interchangeable platform on top of the chassis element 1. According to the invention, the chassis element 1 has its rear section provided with a guide roller 2 close to an axial line 15 extending between the wheels 3. By virtue of this configuration, the vertical force vector extending downwards upon hauling the platform 10 on top of the chassis 1 is positioned so close to the wheel axle that the tow bar or beam in its released condition does not rise up at any time. On the other hand, the underside of the platform 10 is provided with a guide bar 13, extending lengthwise of the platform and intended for cooperation with the guide roller 2 as the platform is being hauled on top of the chassis element 1. In addition, the top side of the chassis element 1 is provided with bearing rollers 9 for moving the platform on top of the chassis element. These include rearmost bearing rollers 9a for receiving the platform and for preventing a lateral tilting of the platform during the course of lifting the platform. These rearmost bearing rollers 9a are preferably located slightly inwards from the axial line of the guide roller 2. Such a set-in of the rear rollers enables the platform to be lifted on top of the chassis in a slightly inclined position, nor does the platform get stuck underneath the rear rollers during its lifting process. The guide bar 13 present in the underside of the platform 10 has a cross-section in the shape of a reversed U and the guide roller 2 is provided with a slot 14 for accommodating the downward flanks of the guide bar 13 (FIGS. 5 and 6). The hauling cable is preferably adapted to be secured inside the guide bar 13.

Figure 1:
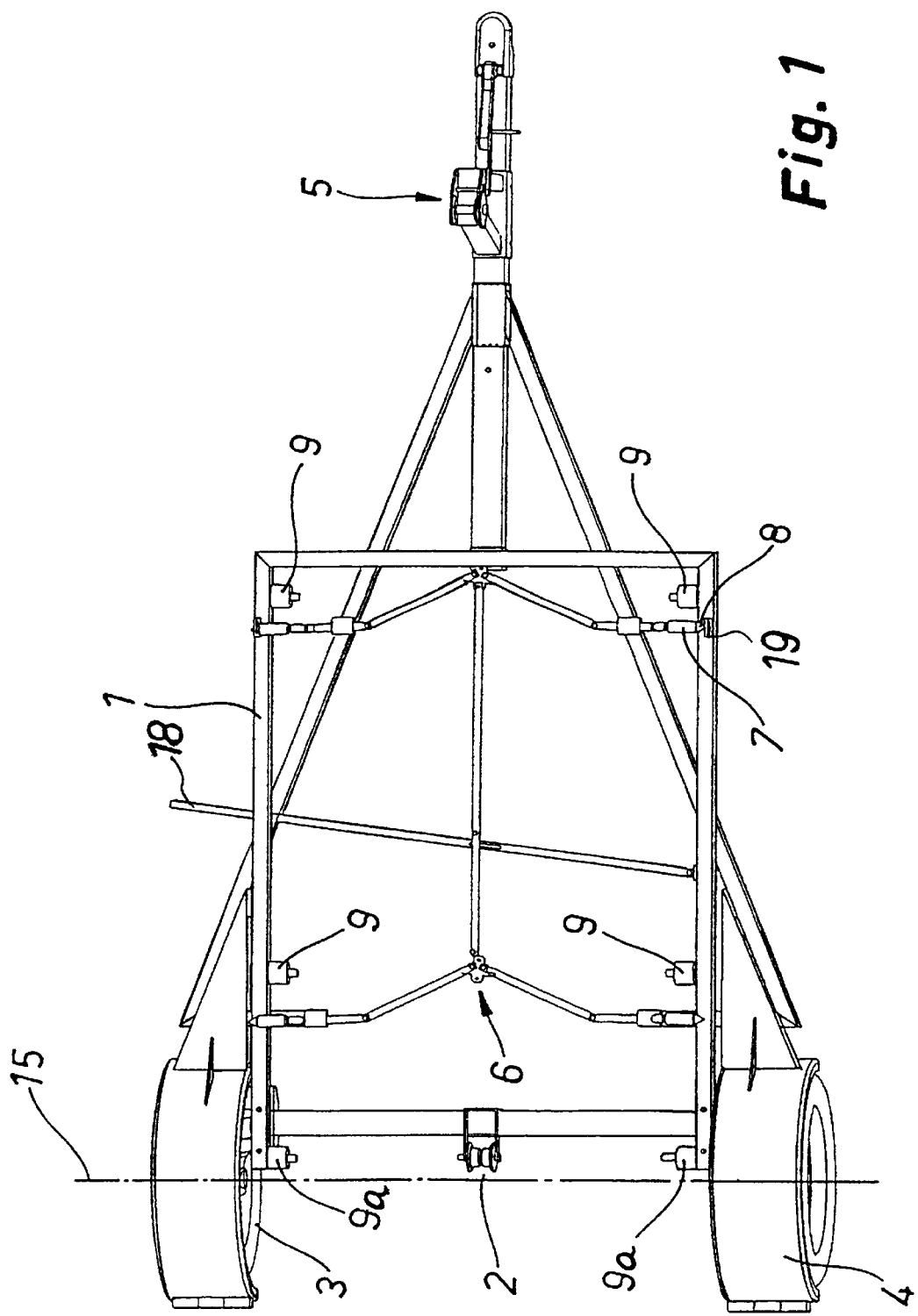
FIG. 1 shows a chassis element for a trailer of the invention in one embodiment and in a plan view.
Figure 2:
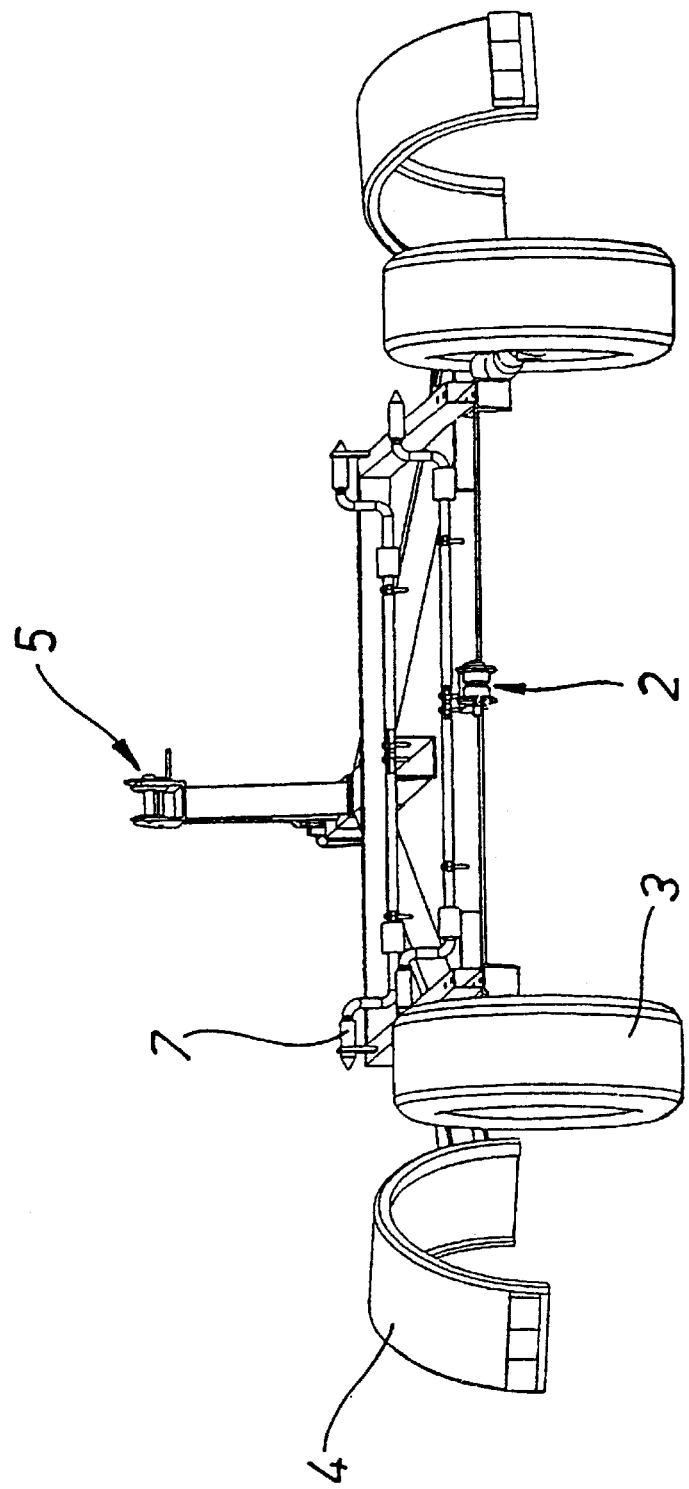
FIG. 2 shows the chassis element of FIG. 1 in a view from behind.
Figure 3:
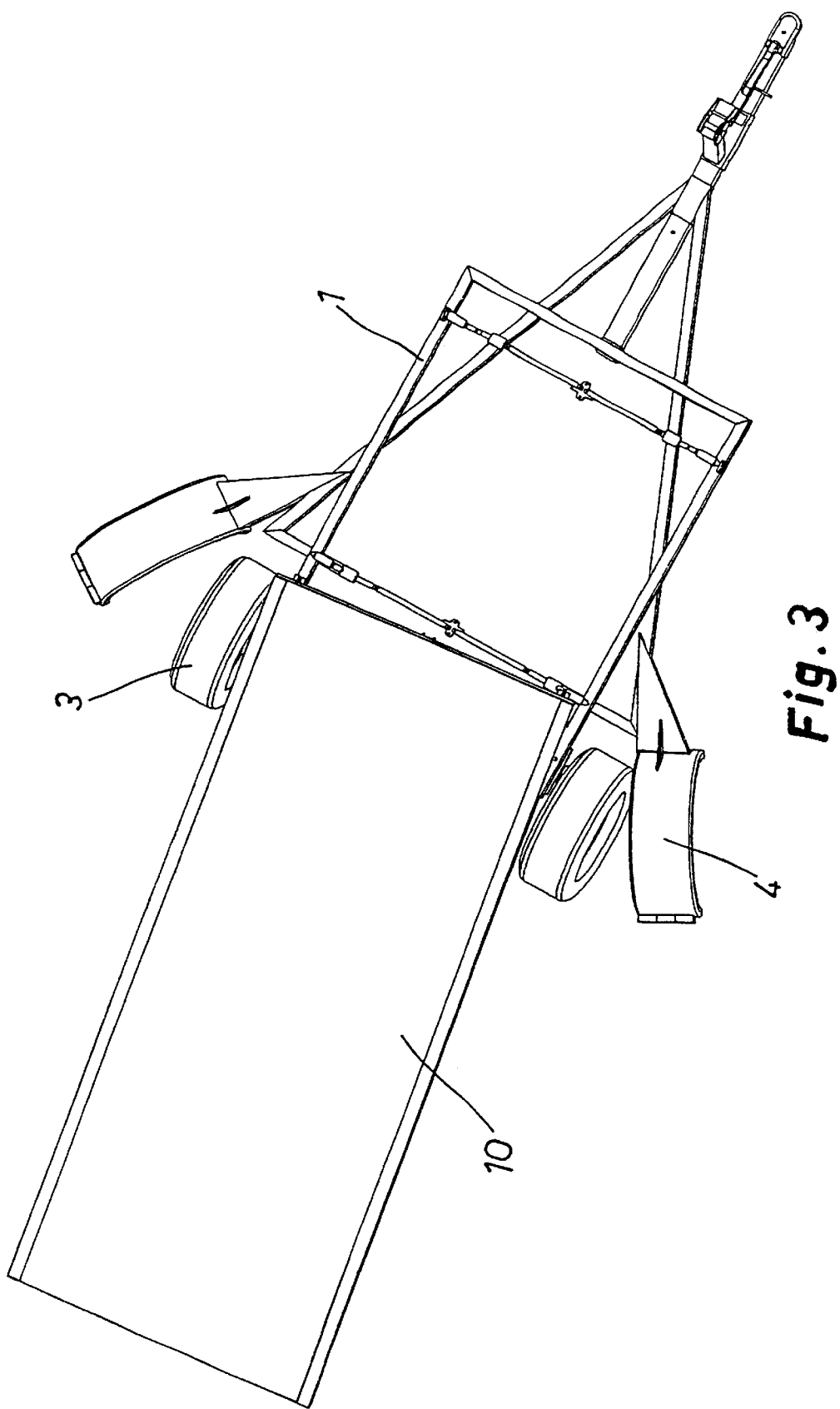
FIG. 3 shows the chassis element of FIG. 1 together with an interchangeable platform.
Figure 4:
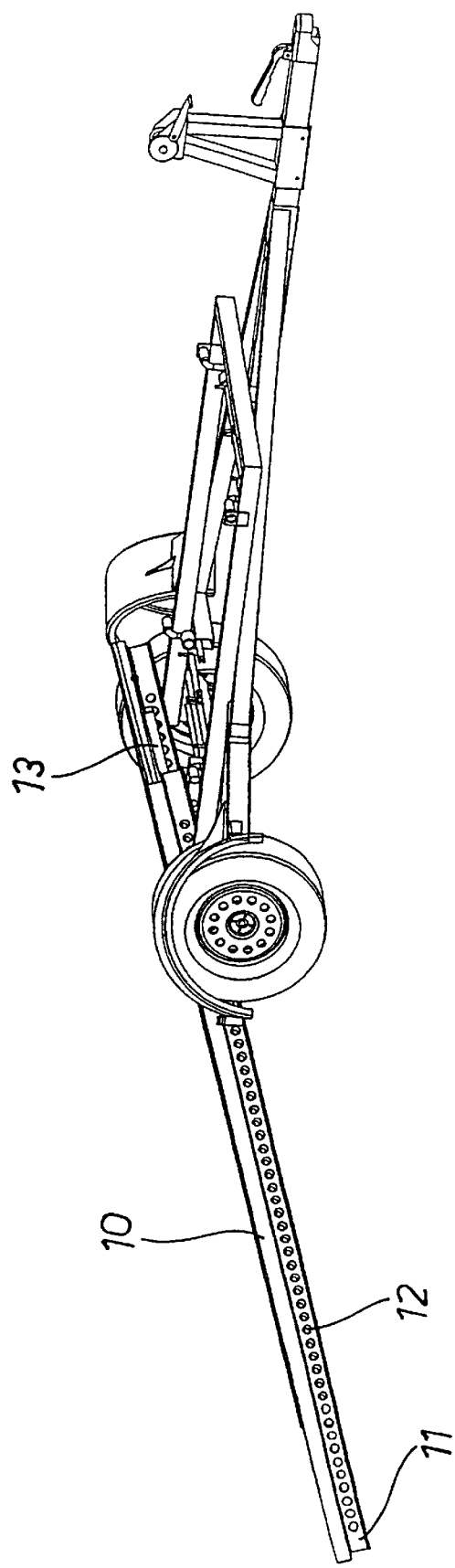
FIG. 4 shows the condition of FIG. 3 in a lateral view.

The interchangeable-platform trailer of the invention is further provided with a locking mechanism 6, comprising a linkage 6 which is pivotable by means of a lever 18 and which in the present embodiment includes four locking bolts 7 movable in the direction transverse to the length of the chassis element 1 through guide holes included in guides 19 mounted on the sides of the chassis element. The locking mechanism 6 is preferably provided with spring means (not shown), which urge to pull the linkage to a locking position upon releasing the operating lever 18. The locking bolts 7 are further provided with a tapering, e.g. conical or wedge-shaped tip portion 8 for facilitating the guidance thereof through locking holes 12 present in a runner 11 fitted below the lengthwise side edge of the platform 10. FIG. 3 depicts the interchangeable platform 10 placed in a slightly inclined position on top of the chassis element 1. When hauling the platform 10 onto the chassis element 1, the tires 3 function as guides. Thus, fenders 4 are turned aside (FIGS. 2 and 3). The slot 14 in the guide roller 2 is bevelled in terms of its flanks and, hence, the guide bar 13 is able to travel on top of the guide roller 2 also in a position somewhat misaligned relative to the chassis element 1. When the platform has been hauled onto the chassis element 1 sufficiently far to bring the center of gravity of the platform close to the guide roller 2, the trailing edge of the platform leaves the ground. At that point, the hauling cable turns the misaligned platform to a perfect alignment with the chassis. When the platform has been hauled onto the platform to a point appropriate in terms of the beam weight, the lever 18 is operated for pushing the locking bolts 7 through the locking holes 12 present in the runner 11 fastened to the underside of the platform for locking the platform in place. The conical tip 8 of the locking bolt 7 assists the bolt in finding the hole, even if the components were not in a perfect alignment with each other. The locking bolt 7 and the hole 12 in the runner 11 can be positioned in such a manner that the locking bolt 7 elevates the platform upon passing through the hole 12. A result of this arrangement is that the small amount of ice, snow, or dirt possibly present on the underside of the runner does not prevent engagement of the locking system due to an unexpected difference in elevation.

What is claimed is:

1. A light-duty trailer hitchable to a passenger car, a van or the like, comprising a separate chassis element equipped with wheels, and an interchangeable platform mountable thereon, said chassis element being provided with means for hauling the platform on top of the chassis element, characterized in that the chassis element has its rear section provided with a guide roller close to an axial line extending between the wheels, and that the underside of the platform is provided with a guide bar, extending lengthwise of the platform and intended for cooperation with the guide roller as the platform is being hauled on top of the chassis element.

2. A light-duty trailer as set forth in claim 1, wherein the chassis element is further provided with bearing rollers present in its top side for moving the platform on top of the chassis element.

3. A light-duty trailer as set forth in claim 1, wherein the guide bar has a cross-section in the shape of a reversed U, and that the guide roller is provided with a slot for accommodating the downward flanks of the guide bar.

4. A light-duty trailer as set forth in claim 1, further comprising locking means for locking the interchangeable platform at a desired spot to the chassis element.

5. A light-duty trailer as set forth in claim 4, wherein the locking means include a locking bolt movable crosswise relative to the length of the chassis element, and a runner set on the bottom edge of the lengthwise side of the interchangeable platform and provided with attachment holes for the locking bolt.

6. A light-duty trailer as set forth in claim 5, wherein the locking bolt is provided with a tapering tip portion.

7. A light-duty trailer as set forth in claim 2, wherein the guide bar has a cross-section in the shape of a reversed U, and that the guide roller is provided with a slot for accommodating the downward flanks of the guide bar.

8. A light-duty trailer as set forth in claim 7, further comprising locking means for locking the interchangeable platform at a desired spot to the chassis element.

9. A light-duty trailer as set forth in claim 8, wherein the locking means include a locking bolt movable crosswise relative to the length of the chassis element, and a runner set on the bottom edge of the lengthwise side of the interchangeable platform and provided with attachment holes for the locking bolt.

10. A light-duty trailer as set forth in claim 9, wherein the locking bolt is provided with a tapering tip portion.

11. A light-duty trailer as set forth in claim 2, further comprising locking means for locking the interchangeable platform at a desired spot to the chassis element.

12. A light duty trailer as set forth in claim 11, wherein the locking means include a locking bolt movable crosswise relative to the length of the chassis element, and a runner set on the bottom edge of the lengthwise side of the interchangeable platform and provided with attachment holes for the locking bolt.

13. A light-duty trailer as set forth in claim 12, wherein the locking bolt is provided with a tapering tip portion.

14. A light-duty trailer as set forth in claim 3, further comprising locking means for locking the interchangeable platform at a desired spot to the chassis element.

15. A light-duty trailer as set forth in claim 14, wherein the locking means include a locking bolt movable crosswise relative to the length of the chassis element, and a runner set on the bottom edge of the lengthwise side of the interchangeable platform and provided with attachment holes for the locking bolt.

16. A light-duty trailer as set forth in claim 15, wherein the locking bolt is provided with a tapering tip portion.

* * * * *